United States Patent [19]
Alborante

[11] Patent Number: 5,115,115
[45] Date of Patent: May 19, 1992

[54] APPARATUS FOR WELDING MOTOR-VEHICLE BODIES

[75] Inventor: Giancarlo Alborante, Trofarello, Italy

[73] Assignee: Comau S.p.A., Turin, Italy

[21] Appl. No.: 648,752

[22] Filed: Jan. 31, 1991

[30] Foreign Application Priority Data

Jan. 31, 1990 [IT]  Italy ............................. 52850/90[U]

[51] Int. Cl.$^5$ ............................................. B23K 26/00
[52] U.S. Cl. .......................... 219/121.63; 219/121.76
[58] Field of Search ..................... 219/121.63, 121.64, 219/121.76, 121.77

[56] References Cited

U.S. PATENT DOCUMENTS 4,162,387 7/1979 DeCandia ............................ 219/79
4,973,817 11/1990 Kanno et al. .................. 219/121.63

Primary Examiner—C. L. Albritton
Attorney, Agent, or Firm—Sughrue, Mion, Zinn Macpeak & Seas

[57] ABSTRACT

In flexible apparatus for welding different types of motor-vehicle body in which the bodies, assembled loosely beforehand, are supplied to a welding station provided with a plurality of locating devices for clamping the component parts of the body in the correct positions for welding and with welding means for welding the component parts of the body together after they have been clamped by the locating devices, the locating devices are supported by at least two pairs of locating frames which are movable along a predetermined path so as to be interchangeable rapidly at the working position in accordance with the type of body located at the welding station to be welded, the locating devices of each pair of locating frames being suitable for a respective type of body. The welding means comprise one or more laser-welding robots. Each locating device has an element for engaging the body, the element having a through hole for allowing the passage of a laser beam output by a welding robot and the focussing of the beam on a point on the body to be welded.

3 Claims, 3 Drawing Sheets

APPARATUS FOR WELDING MOTOR-VEHICLE BODIES

The present invention relates to apparatus for welding motor-vehicle bodies which have been assembled loosely beforehand, of the known type comprising:

a station for welding the body, a conveyor line for transporting the loosely preassembled bodies to the welding station, a plurality of locating devices arranged at the welding station for clamping the component parts of the body in the correct positions for welding, and welding means provided at the welding station for welding the component parts of the body together after they have been clamped by the locating devices, in which the locating devices are supported by at least two pairs of locating frames along a predetermined path so as to be interchangeable rapidly at the working position according to the type of body located at the welding station to be welded, the locating devices of each pair of locating frames being suitable for a respective body type.

Apparatus of the aforesaid type is described and illustrated in, for example, German patent No. 2,810,822 (which corresponds to U.S. Pat. No. 4,162,387) and in European patent application No. EP-A-0 351 377 by the same Applicant.

In the said known apparatus, the welding means are constituted by a plurality of electrical spot-welding guns, at least some of which are carried by robots which can be programmed in accordance with the specific type of body to be welded.

In order to improve these known devices, the present invention provides welding apparatus of the type indicated at the beginning, characterised in that the welding means include one or more laser-welding robots and in that each locating device has an element for engaging the body, the element having a through-hole for allowing the passage of a laser beam output by a welding robot and the focussing of the beam on the body to be welded.

The welding robot, which is programmable in accordance with the specific type of body to be welded, may be of the type including a head for focussing the laser beam which is connected optically to a laser source by means of a series of mirrors which are arranged within the structure of the robot and which cause the laser beam output by the laser source to follow a path within the robot until it reaches the focussing head.

In another preferred embodiment, the robot is of the type including a head for focussing the laser beam which is connected optically to a laser source by means of a bundle of optical fibres.

The use of YAG (Yttrium Aluminum Garnet) laser emittors produced, for example, by Lumonics JK Industrial Products, is particularly advantageous.

It should be noted that laser-welding apparatus for motor-vehicle bodies, in which each locating device for the body has a body-engagement element with a hole for the passage of a laser beam, is already known from German patent application No. 3 536 015. In this known solution, however, a laser-beam focussing unit is also associated with the engagement element with the through-hole and makes the structure of the locating device heavy, bulky, complex and expensive. In the present invention, each locating device is formed conventionally, except for the provision of the through-hole, and the focussing head is provided on the welding robot with the advantage that the head can cooperate with several locating devices in order to weld the body in correspondence with those devices.

Further characteristics and advantages of the invention will become clear from the description which follows with reference to the appended drawings, provided purely by way of non-limiting example, in which.

Figure 1:
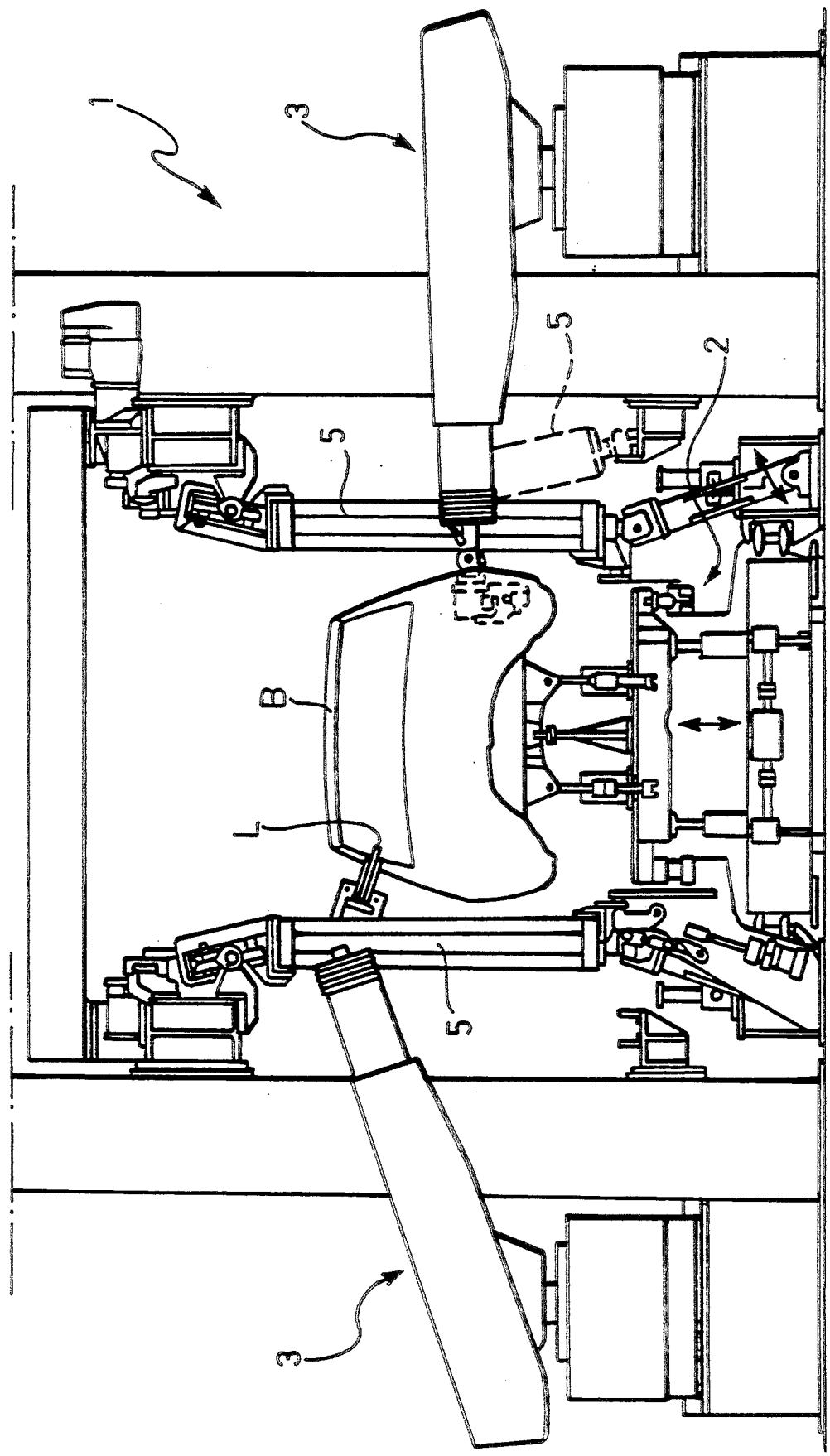
FIGS. 1 and 2 show a prior-art welding device.
Figure 2:
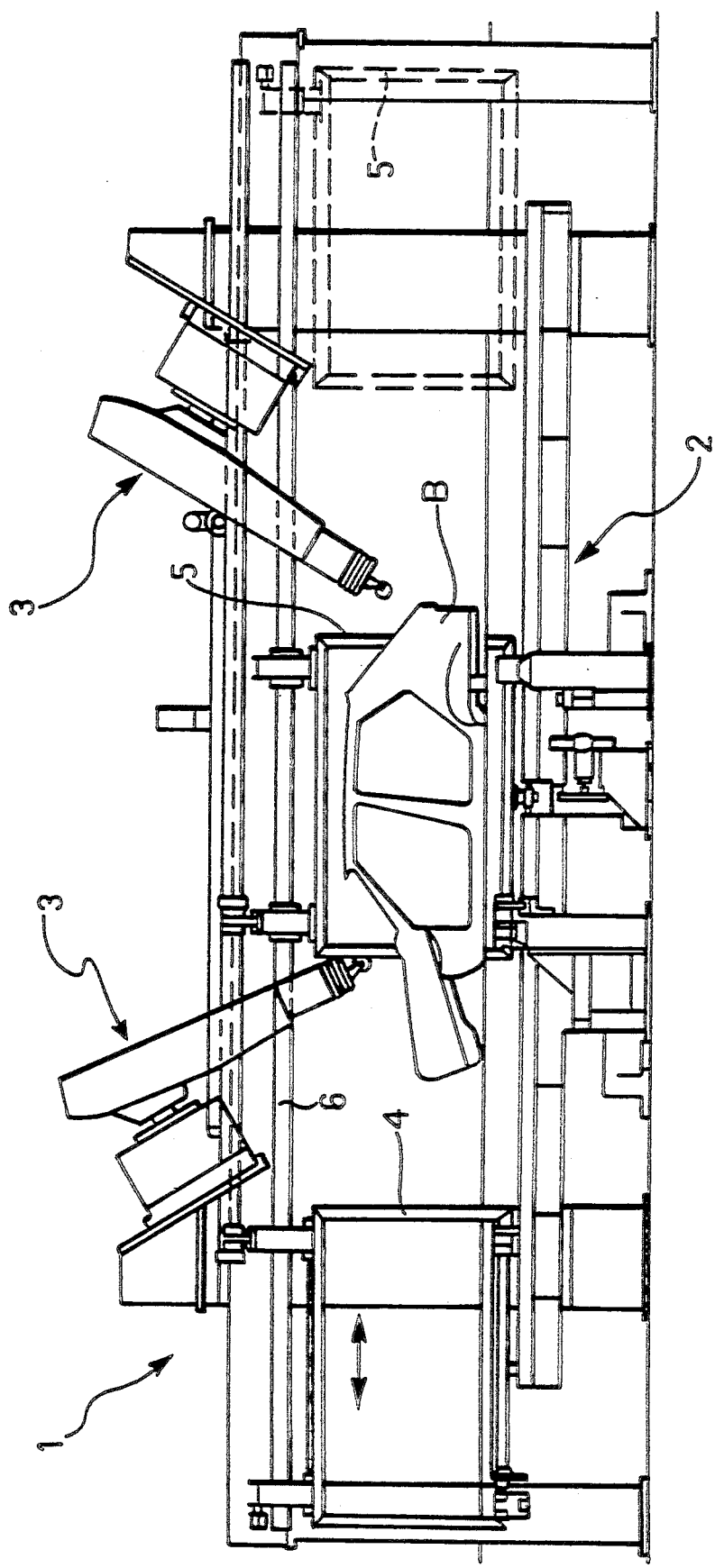

FIGS. 1 and 2 of the appended drawings show a known welding device and correspond to FIGS. 1 and 2 of German patent No. 2,810,822 by the same Applicant (or of the corresponding U.S. Pat. No. 4,162,387). A detailed description of the structure illustrated in these drawings is contained in these known documents. A brief description of this known structure will be given below, in any case, in order to facilitate an understanding of the present invention.

With reference to FIGS. 1 and 2, a station for the electrical spot-welding of motor-vehicle bodies is generally indicated 1 and is adapted to operate on two different types of body. The bodies B are fed through the station 1 by means of a conveyor line 2. The welding is carried out by a plurality of programmable robots 3 each having an electrical welding gun. The bodies enter the welding station in a condition in which they are connected loosely together, for example, by means of bent tongues or by means of support devices carried by the conveyor line which hold the various parts of the body in relative positions approximating to their final welding positions.

Because the body parts reach the welding station in a loosely-connected condition, they must be clamped in their exact welding positions before the welding is carried out. Locating devices are provided for this purpose and are constituted by a plurality of clamping jaws which engage the body components and keep them in their precise relative positions during welding. The clamping jaws are carried by two pairs of locating frames 4, 5 situated at the two sides of the station, the frames being slidable on longitudinal guides 6 so that they can be interchanged rapidly at the working position according to the type of body located at the welding station to be welded. The locating devices of each pair of locating frames are suitable for a respective body type. By way of example, FIG. 1 shows a locating device L.

In the embodiment illustrated, when the locating frames 4, 5 are in their working positions, they are also movable between positions in which their lower ends are spaced apart (see the broken line in FIG. 1) to allow the body to pass freely through the station and positions (shown in continuous outline in FIG. 1) in which they are parallel and vertical and in which the locating devices engage the body to be welded.

Figure 3:
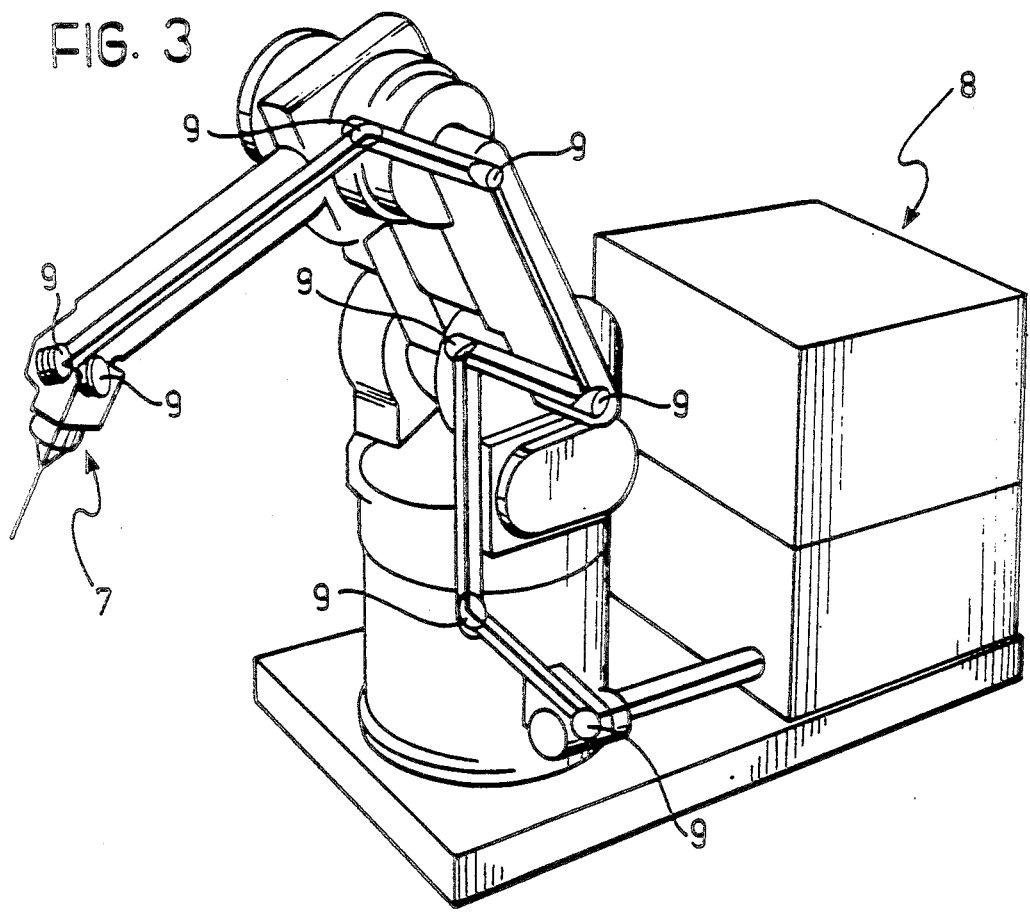
FIG. 3 shows a first type of laser-robot usable in the device according to the invention.

According to the present invention the electrical welding guns are replaced by laser torches, that is, laser focussing heads carried by welding robots. FIG. 3 shows a first embodiment of a laser-robot, of a type manufactured by the Applicant, including a laser-focussing head 7 which receives a laser beam from a laser source 8. The laser beam output by the source 8 follows a predetermined path wholly within the structure of the robot, being reflected successively by a plurality of mirrors 9 arranged in the structure of the robot. The specific configuration of the robot is not described in detail herein since the configuration shown in the drawing is of known type and, at the same time, this configuration does not fall within the scope of the present invention.

Alternatively (FIG. 4), it is possible to provide a robot 10 with a laser-focussing head 11 which is connected to a laser source (not visible in FIG. 4) by means of a bundle of optical fibres 12.

Figure 4:
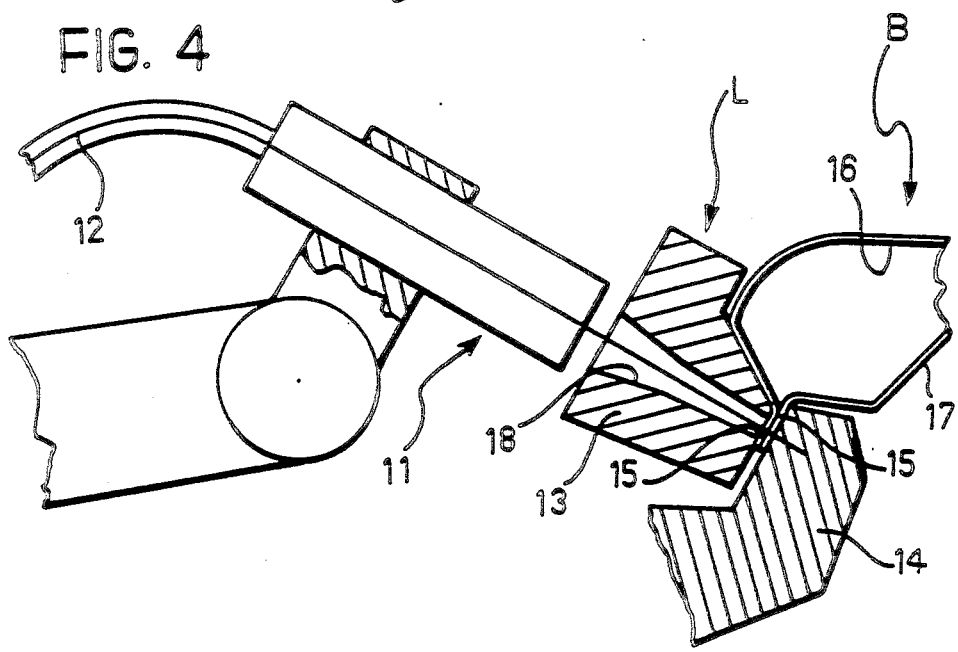
FIG. 4 shows a second type of laser-robot usable in the present invention.

Both in the case of FIG. 3 and in the case of FIG. 4, it is necessary to arrange the locating devices L to allow the passage of the laser beam focussed by the head 11 FIG. 4 shows a locating device L with two elements 13, 14 for engaging the body. FIG. 4 shows these elements in their closed position, in which they urge together two flanges 15 which form parts of two sheet-metal elements 16, 17 of the body B to be welded together. The element 13 has a through-hole 18 whose diameter decreases progressively towards the end which faces the flange 15 to allow the passage of the laser beam output by the focussing head of the robot and the focussing of the beam on the flanges 15 to be welded together.

Naturally, the principle of the invention remaining the same, the details of construction and forms of embodiment may be varied widely with respect to those described and illustrated purely by way of example, without thereby departing from the scope of the present invention.

What is claimed is:

1. Apparatus for welding motor-vehicle bodies which have been assembled loosely beforehand, comprising:
    a station for welding the body,
    a conveyor line for transporting the loosely preassembled bodies to the welding station,
    a plurality of locating devices arranged at the welding station for clamping the component parts of the body in the correct positions for welding, and
    welding means provided at the welding station for welding the component parts of the body together after they have been clamped by the locating devices,
    in which the locating devices are supported by at least two pairs of locating frames movable along a predetermined path so as to be interchangeable rapidly at the working position according to the type of body located at the welding station to be welded, the locating devices of each pair of locating frames being suitable for a respective body type,
    wherein said welding means include at least one laser-welding robot and at least some of said locating devices each have an element for engaging said body, each element defining a through hole for allowing the passage of a laser beam output by a said welding robot and the focussing of said beam on the body to be welded.

2. Apparatus as claimed in claim 1, wherein said laser-welding means include a laser source and a bundle of optical fibres connecting said laser source to said laser-welding head.

3. Apparatus as claimed in claim 1, wherein said laser-welding means include a laser source and a series of mirrors arranged within said robot to provide an optical connection between said laser source and said laser-welding head.

* * * * *